United States Patent
Wang

(10) Patent No.: US 6,230,095 B1
(45) Date of Patent: May 8, 2001

(54) SYSTEM AND METHOD FOR CYLINDER POWER IMBALANCE PROGNOSTICS AND DIAGNOSTICS

(75) Inventor: Yue Yun Wang, Columbus, IN (US)

(73) Assignee: Cummins Engine Company, Inc., Columbus, IN (US)

(*) Notice: Subject to any disclaimer, the term of this patent is extended or adjusted under 35 U.S.C. 154(b) by 0 days.

(21) Appl. No.: 09/401,179

(22) Filed: Sep. 22, 1999

Related U.S. Application Data

(63) Continuation of application No. 09/033,126, filed on Mar. 2, 1998, now Pat. No. 6,006,154.

(51) Int. Cl.[7] .................................................. G01M 15/00
(52) U.S. Cl. ........................... 701/110; 73/116; 73/117.3; 123/419; 701/111
(58) Field of Search .................................. 701/101, 110, 701/111; 73/116, 117.2, 117.3; 123/419

(56) References Cited

U.S. PATENT DOCUMENTS

| | | | | |
|---|---|---|---|---|
| 4,135,246 | * | 1/1979 | McMannis | 73/116 |
| 4,301,678 | * | 11/1981 | Full et al. | 73/116 |
| 4,883,038 | | 11/1989 | Nakaniwa . | |
| 5,044,195 | * | 9/1991 | James et al. | 73/117.3 |
| 5,200,899 | * | 4/1993 | Ribbens et al. | 701/111 |
| 5,241,480 | | 8/1993 | Takaku et al. . | |
| 5,325,833 | | 7/1994 | Fukui et al. . | |
| 5,493,901 | | 2/1996 | Kuroda et al. . | |
| 5,505,079 | * | 4/1996 | Rossignol | 73/117.3 |
| 5,605,132 | | 2/1997 | Hori et al. . | |
| 5,623,412 | | 4/1997 | Masson et al. . | |
| 5,633,456 | | 5/1997 | Stander . | |
| 5,680,310 | * | 10/1997 | Morgan et al. | 701/101 |
| 5,708,200 | * | 1/1998 | Rossignol | 73/116 |
| 5,771,482 | * | 6/1998 | Rizzoni | 701/101 |
| 6,006,154 | | 12/1999 | Wang . | |

OTHER PUBLICATIONS

Azzoni, P. et al, "Misfire Detection in a High– Performance Engine Using Statistical Signal Processing", Submitted for Presentation at 13th IFAC World Congress, San Francisco, CA Jul. 1–7, 1996.

\* cited by examiner

*Primary Examiner*—George Dombroske
(74) *Attorney, Agent, or Firm*—Baker & Daniels

(57) ABSTRACT

A system and method for the diagnosis and prognosis of cylinder power imbalance in an internal combustion engine utilizes cylinder firing times to determine a differential value indicative of the power imbalance. This differential value identifies a cylinder power imbalance condition and can be used in a one dimensional or a two dimensional analysis to predict future engine performance. In one embodiment, a trend parameter is calculated from the differential values over several test sequences at periodic mileage of the vehicle. The rate and magnitude of change or deterioration of the engine performance is indicated by the trend parameter. In another embodiment, a two dimensional trend array is evaluated using singular value decomposition to arrive at an eigenvalue transformation matrix used to obtain two trend variables related to the two principal eigenvalues at a particular engine operating hour/mileage. In one specific embodiment, the two trend variables are converted to polar coordinates in which the polar radius $\rho$ is indicative of the severity of the imbalance condition and the polar angle $\theta$ is indicative of the cause or of a change of cause for the engine power imbalance.

4 Claims, 4 Drawing Sheets

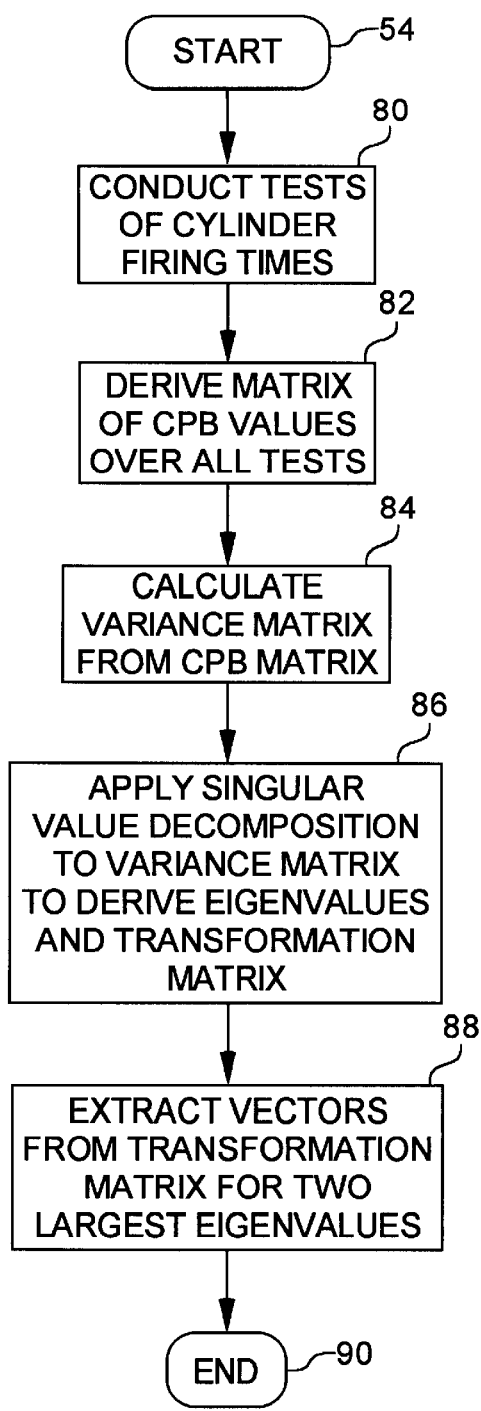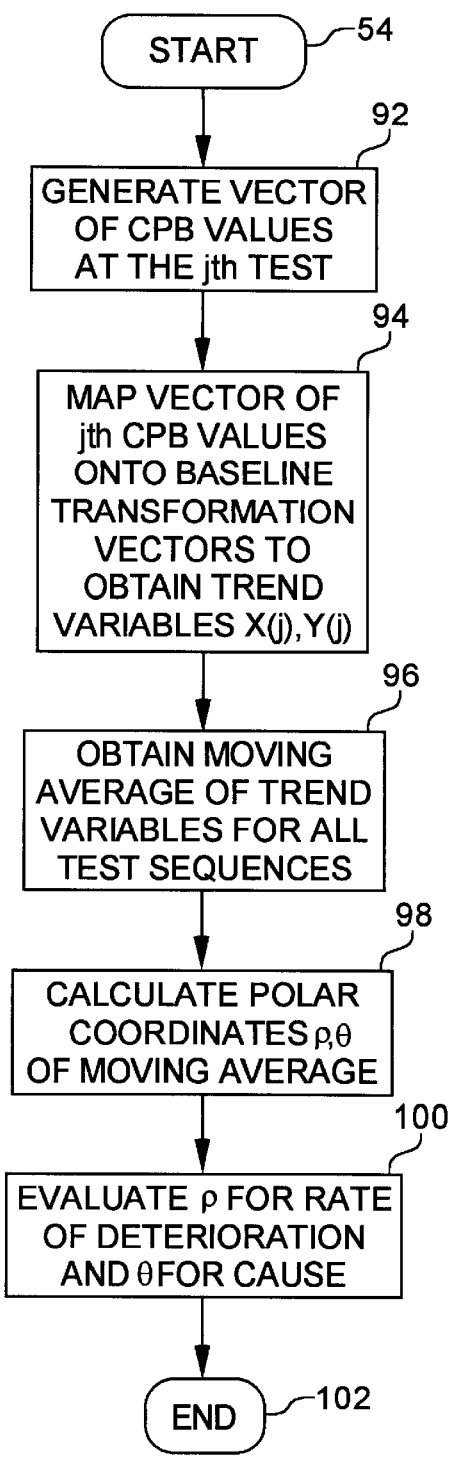
FIG. 9          FIG. 10

SYSTEM AND METHOD FOR CYLINDER POWER IMBALANCE PROGNOSTICS AND DIAGNOSTICS

This Application is a Continuation of application Ser. No. 09/033,126, filed on Mar. 2, 1998, issued as U.S. Pat. No. 6,006,154 on Dec. 21, 1999, and owned by the Assignee of the present invention.

FIELD OF THE INVENTION

The present invention relates to the diagnosis and prediction of power imbalance conditions between cylinders of an internal combustion engine. Specifically, this invention provides a system and method for detecting the existence of such a power imbalance and for providing a prognosis as to the nature of the imbalance. The prognosis can be used to provide a warning to the vehicle operator or as a tool for engine service recommendations.

BACKGROUND OF THE INVENTION

Most industrial and automotive internal combustion engines include a pair of cylinder banks, each including a plurality of cylinders. For example, a V-8 engine includes two banks of four cylinders each. With the advent of electronic controls, the operating conditions of each of the cylinders is controlled by an on-board engine control computer or an electronic controller. The typical electronic controller provides signals to electrically actuated fuel control systems, firing timing systems and air intake systems. In diesel engines, the electronic controller performs the critical task of controlling the timing of operation of the fuel injectors to ensure optimum combustion performance. The electronic controller also acts as a speed governor, accepting input from the accelerator pedal and sensing engine load conditions to establish an engine speed.

Power imbalance between engine cylinders can have obviously deleterious effects on overall engine performance. Moreover, cylinder power imbalance can cause an engine to "run dirty" so that the engine emissions exceed federal and local environmental regulations. The causes of cylinder power imbalance are many, but can be broadly categorized as reductions in combustion quality. This reduction can arise in a diesel engine from a drop in injector nozzle opening pressure, a stuck plunger, clogged injectors, unsealed valves, valve gap discrepancies, and the like. Other causes can arise in the fuel pump or can be attributed to a "dead" cylinder.

Many approaches have been implemented to identify when a cylinder power imbalance exists, or when a particular cylinder performance is below acceptable operating limits. However, these prior approaches only operate as a sort of "go—no go" gauge and are generally only useful to determine that a cylinder is a problem. Thus far, none of these prior systems can diagnose the source of the engine power problem. Moreover, no prior system has the capability to provide a prognosis of future engine performance so that the vehicle operator can avoid break-downs on the road due to deteriorating engine performance.

Consequently, there remains a need in the arena of engine performance evaluation for a system that can not only diagnose, but also predict engine performance problems. This need is best fulfilled by an on-board system that performs its appointed evaluation automatically when the engine is at idle conditions.

SUMMARY OF THE INVENTION

The present invention provides a system and method for not only diagnosing but also predicting causes of engine performance degradation. The invention is particularly suited to evaluating changes in cylinder power balance conditions over time, engine hours or mileage. In one feature of the invention, a firing time differential value is calculated for each cylinder based upon the firing time of the cylinder relative to the firing time of the prior cylinder. In one embodiment, these cylinder differential values are compared to a predetermined limit value derived from empirical data for an optimally performing engine. If any differential firing time value for a cylinder exceeds the limit value, a warning signal is generated indicating that a problem exists with the engine, such as cylinder power imbalance.

In a further aspect of the invention, this diagnostic aspect is carried a step further by features that evaluate the firing time differential data over time to form a prognosis as to the cause and severity of the degradation in engine performance. In one embodiment a one dimensional analysis is conducted in which a trend value is derived from all of the firing time differentials obtained at a specific engine hour or mileage. This trend value is then compared to trend values from prior test sequences at earlier engine hours or mileage.

In one feature, if the trend value for the current test sequence exceeds a trend boundary, a warning signal is generated indicating a degradation in engine performance. Under this circumstance, the rate and magnitude of the change in trend value can be calculated and evaluated as an indication of the source and severity of the problem. In one embodiment, the magnitude of the trend parameter change over time can provide an indication that the engine performance deterioration is due to a different cause from prior test sequences. An evaluation of the rate of change of the trend value can provide an indication of the rate of degradation of engine performance. With either parameter, the vehicle operator or engine technician is provided with a real time assessment of the prognosis for engine performance. If the rate and magnitude values exceed certain thresholds, alarms can be provided to prompt immediate engine servicing.

In another aspect of the invention, a two dimensional analysis is contemplated. In this analysis, the cylinder firing time differentials are first obtained for a number of tests as a baseline point for a new engine operated at low idle. A matrix of firing time differentials is developed for all of the cylinders and all of the number of tests. In accordance with this embodiment, a variance matrix is created from the baseline firing time differential matrix, and a singular value decomposition applied to the resulting matrix. This decomposition yields two principal eigenvalues corresponding to the engine cylinder contributing the greatest amount to the cylinder imbalance at the baseline point in the engine life. Two vectors are extracted from the eigenvalue transformation matrix corresponding to the two principal eigenvalues, which vectors are stored in the memory of engine control computer for later use to obtain trend variables during subsequent test sequences.

Subsequent test sequences can be conducted at engine idle at future engine operation hours or mileages, such as every 150 hours or 1000 miles. In each subsequent test sequence, a vector of new differential firing times is obtained over all of the engine cylinders. This vector is mathematically projected into the subspace defied by the two decomposition vectors to obtain the trend variables associated with the test sequence at the particular engine hour/mileage.

In a feature of the invention, these trend variables are converted to polar coordinates. The magnitude or radius of the polar coordinates provides an indication of the severity of the cylinder degradation. The polar angle is indicative of the source of the power imbalance. In addition, changes in the polar angle can indicate a different cause for the engine performance degradation from prior engine hours or mileage.

It is one object of the present invention to provide a system and method that is capable of diagnosing sources of degradation in engine performance. A further object is realized by features of the invention that allow a prognosis for future engine performance to be obtained.

Another object is to provide a system and method that can provide a real time evaluation and indication of the source and severity of conditions causing a degradation in cylinder power, for example. Other objects and special benefits provided by the present invention can be discerned from the following written description and accompanying figures.

DESCRIPTION OF THE FIGURES

FIG. 9 is a detailed flowchart of the baseline run for a two-dimensional prognosis algorithm applied by the system according to a further embodiment of the present invention.

FIG. 10 is a detailed flowchart of the two-dimensional analysis according to the further embodiment conducted at particular engine operating hours or mileages for the diagnosis and prognosis of the engine degradation over time.

DESCRIPTION OF THE PREFERRED EMBODIMENT

Figure 1:
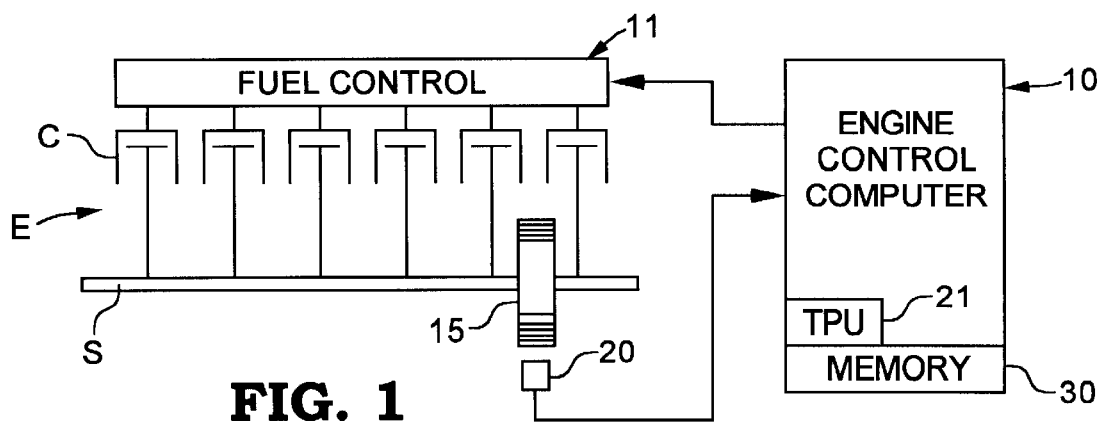
FIG. 1 is a schematic representation of an internal combustion engine incorporating the power balance diagnostic system in accordance with one embodiment of the present invention.

For the purposes of promoting an understanding of the principles of the present invention, reference will now be made to the embodiments illustrated in the drawings and described herein. It is understood that no limitation of the scope of the invention is intended by the specific figures and description. Alterations and modifications of the illustrated system and method as would occur to persons of ordinary skill in the art are contemplated.

The present invention contemplates a system and method for use with a computer controlled internal combustion engine. In the illustrated embodiments, the engine is described as a six cylinder diesel engine. However, it is understood that the principles of this inventive system and method can be applied equally well to spark ignition engines and engines having two or more cylinders.

As illustrated schematically in FIG. 1, an engine E includes a crankshaft S driven by a number of combustion cylinders C. The cylinders C can number two or more and can be arranged in-line or in a V configuration. In the illustrated embodiment, the engine E includes six cylinders, designated herein as cylinders C1, C2, C3, C4, C5, and C6. An engine control computer 10 controls the operating conditions of the engine E. The engine control computer 10 can be of known design to provide electronic control of engine components, such as the fuel control system 11, in accordance with predetermined algorithms. In the illustrated embodiment, the engine control computer implements a series of software instructions with program flow being controlled by engine operating parameters, such as accelerator pedal position and engine loading conditions.

In one aspect of the invention, a tone wheel 15 is mounted for rotation with the engine crankshaft S. The tone wheel 15 includes 35 teeth spaced at ten degree intervals, with one tooth missing for use as a calibration point. A Hall effect sensor 20 is positioned adjacent the tone wheel and provides a signal to the engine control computer 10 upon passage of a tone wheel tooth. This Hall effect sensor 20 is able to sense fluctuations in engine speed caused by variations in the combustion characteristics between cylinders. The tone wheel 15 of the illustrated embodiment includes 35 teeth, although more teeth can be provided a finer resolution for sensing the speed fluctuation, or to account for a greater number of engine cylinders.

The engine control computer 10 provides discrete control of the cylinder firing based upon angular position from top-dead-center (no tooth position) on the tone wheel. For example, the first cylinder C1 can be calibrated to fire at thirty degrees from TDC, which translates to the passage of three teeth of the tone wheel 15 past the Hall sensor 20. In a typical six cylinder engine, the cylinder firing times are measured from 30° after top dead-center and continuing to 120° on the crankshaft S. In this typical engine, the tone wheel will turn two revolutions for firing all six cylinders, so one firing time will span twelve teeth on the tone wheel 15.

Figure 2:
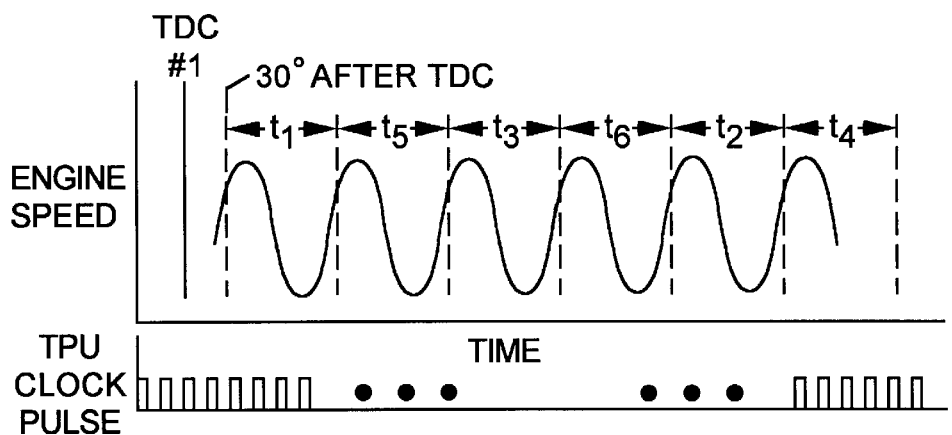
FIG. 2 is a graphical representation of engine speed over time with cylinder firing times identified.

The firing interval for the cylinders can be determined in the present embodiment using a time processing unit (TPU) 21 integrated into the engine control computer 10. This TPU 21 provides accurate high frequency clock pulses, as illustrated graphically in FIG. 2. For example, the TPU can include a 100 kHz clock. As illustrated in FIG. 2, these clock pulses can be mapped over each cycle of the crankshaft rotation The TPU 21 counts the number of clock pulses occurring between passage of the "firing," tooth for each cylinder—i.e., the tooth number corresponding with instructions from the engine control computer 10 directing combustion in the cylinder.

As depicted in FIG. 2, each of the six cylinders of the illustrated engine fire in a predetermined sequence, in this case 1-5-3-6-2-4. The time period between sequential cylinder firings can be determined in the TPU 21 by counting clock pulses between firing tooth passages. In this way, the TPU generates a time value for each cylinder, corresponding in the illustrated embodiment to times t1, t5, t3, t6, t2, and t4. Ideally, in a perfectly running engine, all of the time values t1–t6 are equal. However, each cylinder is mechanically different and each receives air and fuel in different quantities due to losses and tolerances in the engine components. Consequently, even in a well tuned engine the firing time values will vary between cylinders. In many cases, firing time variations are not indicative of poor or deteriorating engine performance. The present invention is concerned with the other cases in which the firing time variations are significant enough to suggest a problem with the engine.

Figure 3:
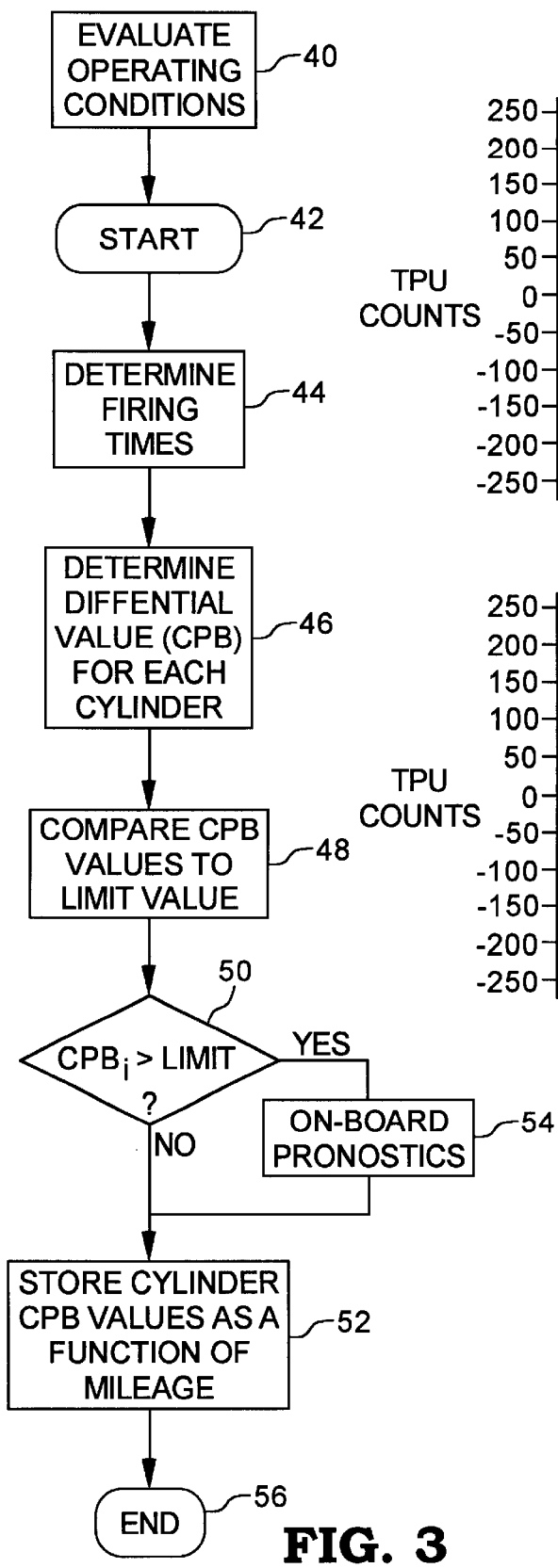
FIG. 3 is a flowchart of the method for diagnosis and prognosis of the engine power imbalance according to one embodiment of the invention.

The steps of one method embodying the present invention are shown in the flowchart of FIG. 3. The inventive diagnosis and prognosis method can be initiated automatically by the engine control computer 10 at a particular engine operating hour or mileage. For example, the method steps can be commenced every 150 hours of engine operation or every 1000 miles of driving. Alternatively, the present method can be invoked by the vehicle operator or engine technician.

The initial step 40 is essentially conducted by the engine control computer 10 and involves ascertaining whether certain operating parameters are met before the cylinder power balance diagnosis begins. In this step, the operating parameters are evaluated to ensure that the engine is operating at its low idle speed. For example, the step 40 can include ensuring that the throttle position is at zero, that the vehicle is stopped or moving below a threshold speed (5 m.p.h. in one embodiment), and that the engine is at its operating temperature as indicated by the coolant temperature (greater than 140° F.). If these conditions are met for some predetermined time period (such as two seconds), then program flow continues to the start 42 of the diagnostic algorithm.

Figure 4:
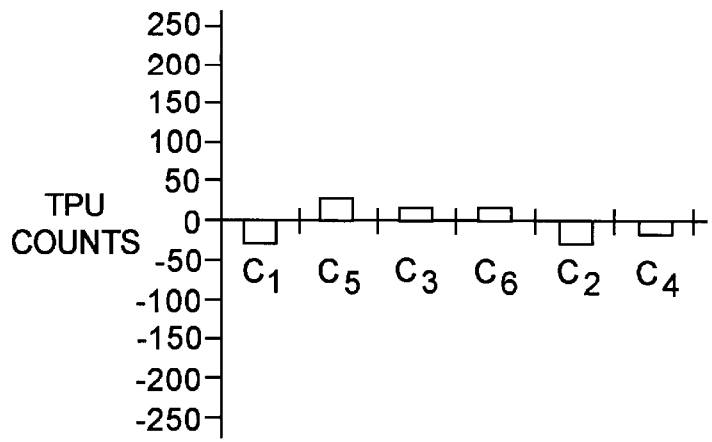
FIG. 4 is a graphical representation of firing time differentials for the cylinders of a typical six-cylinder engine under normal baseline operating conditions.

In the initial diagnostic step 44, the cylinder firing times are determined as described above. In particular, the engine control computer 10 directs the TPU 21 to calculate the firing times t1–t6 in terms of clock pulses. These firing times are preferably stored in the memory 30 of the engine control computer. In the next step 46, a cylinder power balance (CPB) parameter is derived. In accordance with the present invention, a CPB is calculated for each cylinder by comparing the firing time of the subject cylinder to the firing time of the immediately preceding cylinder. Thus, an array of differential firing tines, or CPBs, are obtained according to the following relationships: C1=t4−t1; C2=t6−t2; C3=t5−t3; C4=t2−t4; C5=t1−t5 and C6=t3−t6, where the values Ci are the CPB values for each of the i cylinders. The CPB values C1–C6 are unitless values indicative of the difference in the number of clock pulses counted between successive cylinder firings. The bar graph in FIG. 4 illustrates normal baseline CPB values for the cylinders of the subject six cylinder engine in their firing order. In other words, the CPB values C1–C6 in the bar graph are indicative of an optimally performing engine with no appreciable power imbalance between cylinders. The magnitude of the TPU counts represented by the CPB values in the specific illustrated embodiment do not exceed 50 counts.

On the other hand, an engine that is suffering from, or on the verge of suffering from, a degradation of performance, will have wide ranging CPB values between cylinders. Such an engine is depicted in the bar graph of FIG. 5, where it can be seen that the CPB values for cylinders 2–5, namely C2–C5, are much higher than the other two "healthy" cylinders 1 and 6. In this case, the engine performance is suffering due to a severe power imbalance involving the affected cylinders 2–5.

Figure 5:
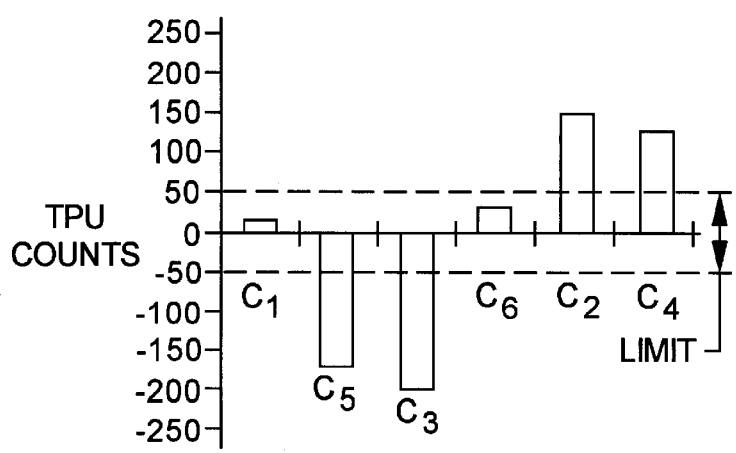
FIG. 5 is a graphical representation of firing time differentials for the engine cylinders under power imbalance operating conditions.

The CPB values shown in FIG. 5 are indicative of an engine power imbalance that is diagnosed in step 48 of the algorithm in FIG. 3. The limit values are predetermined from empirical data in one aspect of the invention. As shown in the bar graph of FIG. 5, these limit values can be ±50 TPU counts, although other limit values can be established as appropriate. Preferably, the limit values are tightly toleranced around the usual and expected CPB parameters for a new engine that has been "broken in", so that even slight deviations outside the limits can be diagnosed to provide a very early indication of engine performance deterioration.

The CPB value Ci for each cylinder is compared to the limit values in step 50, and if each cylinder falls within the limits program control flows to step 52 in which the current CPB values are stored in memory 30 in an array based upon the vehicle mileage. For example, the diagnostics of the present invention can be automatically or manually executed at certain mileage intervals, such as 1000 miles, when an engine tune-up may occur. This data can be accessed periodically to provide a history of the engine and cylinder performance. The diagnostic program then ends at step 56.

Figure 6:
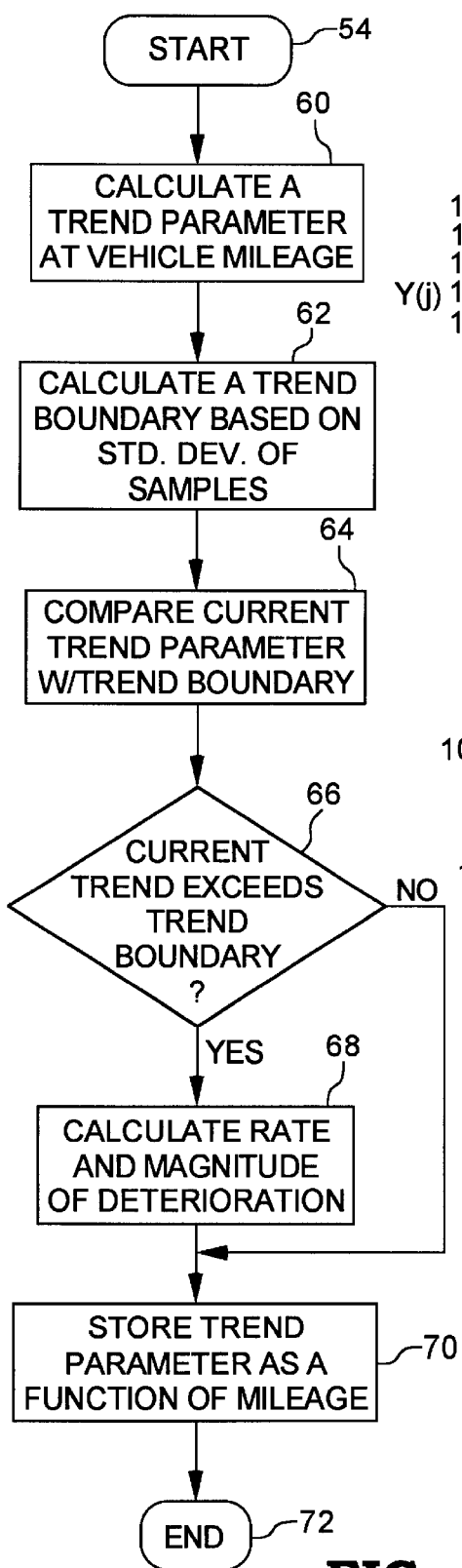
FIG. 6 is a flowchart of a one-dimensional prognosis algorithm applied by the system according to one embodiment of the present invention.

On the other hand, if any one of the cylinder CPB values Ci fails the test at step 50, the engine control computer directs program flow to step 54 in which on-board diagnostics are performed to evaluate the nature of the detected cylinder power imbalance condition. In this step, the present invention envisions performing these diagnostics using either a one dimensional or a two dimensional approach. the steps of the one dimensional analysis are depicted in the flowchart of FIG. 6.

In the one dimensional approach, a trend parameter y(j) is derived in step 60 that equals the root square sum of the CPB parameters Ci for all of the cylinders, signifying the root of the signal power over all of the cylinders. The engine control computer performs the following calculation:

$$y(j) = \sqrt{\sum_{i=1}^{6} Ci^{**}2},$$

where i is 1 thru 6 for a six cylinder engine.

The trend parameter y(j) is derived at the jth test sequence, which can correspond to a test at periodic mileage, such as every 1000 miles. Thus, in accordance with the present invention, a one dimensional array of y(j) values will be derived from the trend parameters calculated at each of the periodic mileages. For example, if the test sequence is run at 3000 mile intervals, at 12000 miles the array y(j) will have four trend parameters y(1)–y(4).

The trend parameter y(j) is, essentially, the root sum of the magnitude of all of the CPB values for the particular engine at a particular test sequence or mileage. This trend parameter for the jth test sequence can be compared to the trend parameters for prior tests at earlier mileages to evaluate whether the cylinder power imbalance represented by the CPB values is deteriorating. This comparison is made graphically in FIG. 7 in which the trend parameter y(j) is plotted over seventeen test sequences. As the graph reveals, the engine operated well over the first nine test sequences, but the engine performance, as measured by the cylinder power imbalance, began to show deterioration at the tenth test. A reduction in engine performance was diagnosed in tests 10–14. According to detailed diagnostics, the nozzle opening pressure (NOP) for some of the cylinders had dropped over that series of tests. A further degradation of engine performance was diagnosed at the fifteenth test that was attributed to a stuck plunger in one cylinder, at the next test due to a dead cylinder and at the last test when a second cylinder died.

Figure 7:
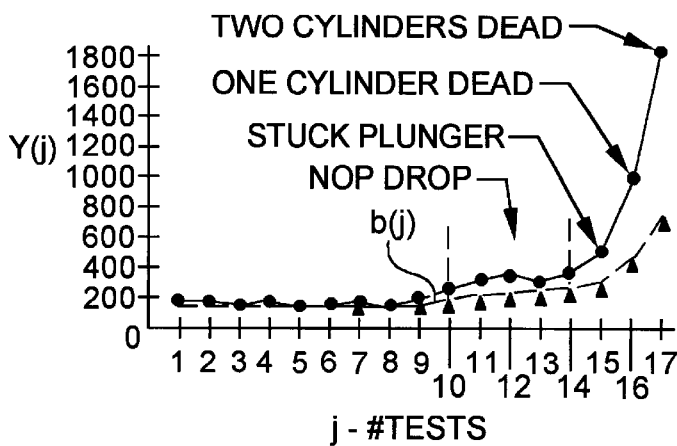
FIG. 7 is a graphical representation of a trend parameter calculated over time in accordance with the method of the present invention as represented in the flowchart of FIG. 6.

While the graph of FIG. 7 is enlightening as a diagnostic tool, the present invention contemplates that the system will provide a prognosis of future engine degradation based upon a statistical evaluation of the trend parameters at each test sequence. Thus, in step 62 of the algorithm in FIG. 6, a trend boundary b is calculated as the standard deviation of all of the y(j) values over all of the test sequences and mileages. In this step, the engine control computer performs the following calculation:

$$b(j) = \bar{y} + \sqrt{\frac{1}{N}\sum_{1}^{N}[y(j)-\bar{y}]^{**}2},$$

where N is the number of test sequences conducted, j=1–N, and $\bar{y}$ is the mean value of all the y(j) values.

This boundary value b(j) is used by the system and method of the present invention as an indicator of relative degradation with each successive test sequence. In this way, the engine control computer can identify an unusual condition that causes a greater than expected reduction in engine performance or cylinder power imbalance. In other words, the boundary value b provides a limit value against which the most recent trend parameter y(j) is compared in, step 64. If the current trend parameter exceeds the boundary value, a new source of engine degradation has been identified that may require more detailed diagnostics.

In the graph of FIG. 7, the trend boundary value b(j) is depicted over time or test sequences. As can be seen from the graph, the boundary value itself changes over time because it is based on the standard deviation of the current test sequence and all of the prior test sequences. Ordinarily, the boundary value b will increase over time because the trend parameters, and ultimately the cylinder CPB values, will increase over time. In the sample engine analysis shown in FIG. 7, it can be seen that the trend parameter y(j) did not appreciably exceed the boundary value b(j) until the tenth test sequence, at which the NOP drop had been identified. The gap between the boundary value b(j) and the trend parameter increased over the successive test sequences increased. The difference between boundary and trend values increased modestly as the NOP dropped, but the more severe cylinder problems that were diagnosed in the last three test sequences generated comparatively more severe differences between y(j) and b(j).

Again, while the graph of FIG. 7 clearly illustrates the deterioration of the engine performance, the present invention contemplates that the engine control computer will generate real time values that can be directly evaluated without external plotting. In accordance with one aspect of the invention, if the trend boundary is exceeded by the current trend parameter in step 66, then the magnitude and rate of deterioration is derived in step 68. The engine control computer 10 performs the following calculations using the current trend parameter y(j) to calculate the magnitude of the deterioration D and the rate of change of the deterioration:

magD=y(j)–[α+b(j)], where α is a pre-determined calibration factor, rateD=(1/M)*[y(j)–y(j–1)], where M is the mileage between the current test sequence for y(j) and the prior test sequence for y(j–1).

Figure 8:
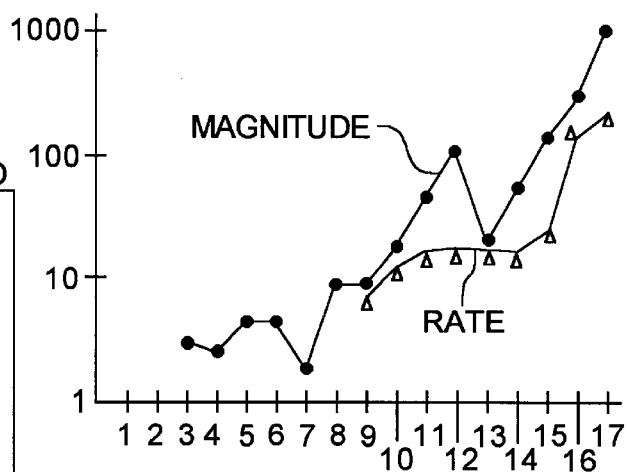
FIG. 8 is a graphical representation of the magnitude and rate of change of the trend parameter represented in the graph of FIG. 7.

For the example shown in FIG. 7, the magnitude and rate of change of the deterioration D is illustrated in the logarithmic graph of FIG. 8. The trend parameters y(j), as well as the magnitude and rate values magD and rate D are stored in the memory 30 by the engine control computer as a function of the current mileage in step 70, and the method ended in step 72.

In one feature of the present inventive system and method, the deterioration values magD and rateD can be used to generate a warning or alarm depending upon the severity of the engine deterioration condition. For example, if the magD value exceeds a predetermined threshold the engine control computer can signal that a new cylinder power balance problem has arisen. Likewise, if the rateD value exceeds another threshold, an alarm can be generated that the engine requires immediate service. Different levels of warning or alarm can be generated as the magD and rateD values exceed different thresholds. In this way, the present invention provides not only diagnosis, but also prognosis of engine performance deterioration. This prognosis allows the vehicle operator or engine technician to intervene and correct a growing engine problem before a catastrophic event occurs.

In addition, the one dimensional analysis performed by the system of the present invention can provide an immediate indication to the vehicle operator of the nature of the engine power imbalance condition. For example, if the imbalance is consistently due to a single deteriorating operating parameter, such as NOP for one cylinder, the rateD will be fairly consistent between test sequences. This phenomenon is reflected by comparing FIG. 7 and FIG. 8. As described in FIG. 7, the trend parameter at tests 10–14 were attributable to an NOP drop in a cylinder. Over these same tests, the rateD value in FIG. 8 is relatively constant. At any point in time, the real time value of rateD can provide an immediate indicator that the engine power balance degradation is rooted in a single cause.

On the other hand, the rateD increased remarkably in FIG. 8 from test sequence 14 on. This dramatic change is reflected in the change in trend value y(j) in FIG. 7 over the same time span. The notations in FIG. 7 indicate that increases in the trend parameter were due to a stuck plunger and two dead cylinders. Each cause was different from the NOP drop in the earlier test sequences. The sharp increase in rateD in FIG. 8 accurately predicted that the degradation in engine performance in test sequences 15, 16 and 17 were each due to different events.

As mentioned above, the present invention contemplates both one dimensional and two dimensional approaches to diagnosis and prognosis of engine power imbalance conditions. The program flow implemented by the engine control computer 10 for the two dimensional analysis is shown in the flowchart of FIGS. 9–10. The steps of this two dimensional analysis are sub-steps of the on-board prognosis step 54 of the overall inventive method in the flowchart of FIG. 3. A baseline run is initially performed, as depicted in the flowchart of FIG. 9. This baseline run generates a pair of vectors that are used in subsequent test sequences at later engine operating hours/mileages.

In order to generate a two dimensional array of cylinder power imbalance CPB values, the first step 80 of the baseline run involves conducting a plurality of tests of the engine firing times. In this step a number of such tests are conducted that is at least equal to the number of cylinders of the engine. In the specific illustrated embodiment, six such tests are performed on each cylinder. More specifically, step 44 of the basic program flow is performed six times to produce a matrix X of CPB values, according to step 82 of the two dimensional approach.

In the next step 84 a variance/co-variance matrix A for the CPB matrix X is derived using standard techniques of statistical analysis. A singular value decomposition for the matrix A is then performed by the engine control computer in step 86 according to the known equation:

A=u s v, where S is the diagonal matrix of eigenvalues λ for each of the real time tests, and v is the transformation matrix.

It is known from singular value decomposition techniques that most of the signal energy for the CPB parameters is concentrated in the first two eigenvalues λ1 and λ2. Thus, in the following step 88 two row vectors v[1] and v[2] are extracted from the transformation matrix v. The two transformation vectors v[1], v[2] are 1×6 vectors corresponding to the number of engine cylinders. At this point, the baseline evaluation is completed and the program ends at step 90 with the storage of the transformation vectors in the memory 30 of the engine control computer 10. It is contemplated that this baseline run shown in the flowchart of FIG. 9 is conducted when the engine and vehicle are new. Ideally, these steps can be performed at the engine manufacturer and the transformation vectors stored in the computer memory before the vehicle reaches the eventual operator.

The results of the baseline run can be illustrated graphically as an ellipse based upon the two transformation vectors. Application of the transformation vectors to the matrix of baseline CPB values for each of the number of baseline test runs produce baseline trend variables x(0), y(0) for each of the test of the baseline tests. The mean and standard deviation of these two baseline trend values over the number of test runs can be calculates and used to plot a baseline ellipse according to the equation:

$\overline{X}^2/\sigma(x)^2 + \overline{Y}^2/\sigma(y)^2 = 1$, where $\overline{X}$ and $\overline{Y}$ are the respective means of the trend variables for the series of test sequences, and $\sigma(x)$ and $\sigma(y)$ are the standard deviations.

Figure 11:
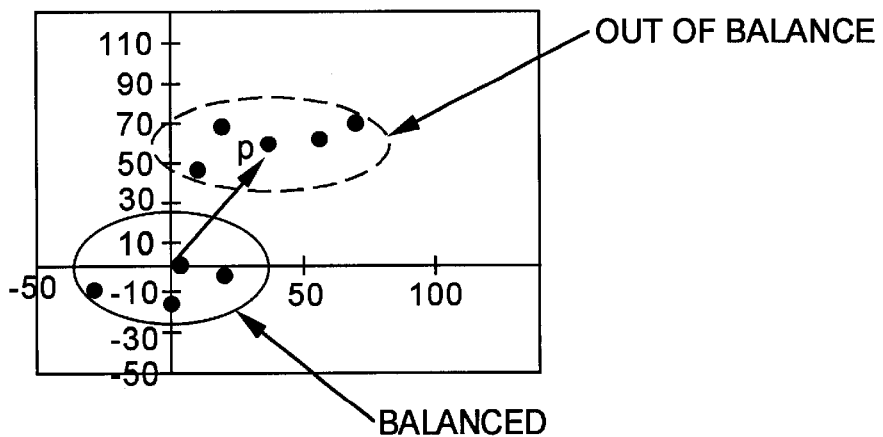
FIG. 11 is a plot of an ellipse of trend parameters used in a two dimensional analysis according to one embodiment of the method of the present invention.

This baseline ellipse is depicted in FIG. 11. According to the present invention, trend parameters from subsequent test sequences that fall within this ellipse are indicative of a generally balanced power among the cylinders. Trend parameters falling outside the ellipse represent a deterioration of the engine performance.

In subsequent test sequences, the two dimensional approach proceeds according to the flowchart in FIG. 10. Again this series of steps are sub-steps to the on-board prognostics step 54 of the main program flow shown in FIG. 5. The prognostic steps of the flowchart in FIG. 10 conducted after the engine has been operated. The test sequences used to obtain the cylinder CPB values can be performed at specific intervals of the engine operating hours or mileage. As described above, these tests can be performed automatically by the engine control computer at the intervals, such as every 150 hours or 1000 miles.

In the first step 92 of the real-time prognostic method, a vector of CPB values is obtained for the jth test. These row vectors are used to calculate trend variables in step 94 representative of tie two principal eigenvalues. These trend variables x(j) and y(j) are comparable to the trend value in the one dimensional analysis described above. In accordance with the present inventive method, the trend variables are generated by mapping the CPB matrix X'(j) onto the two transformation vectors v[1], v[2] obtained from the baseline analysis of FIG. 9. This mapping occurs as follows:

$x(j) = v[1] * X'$ $y(j) = v[2] * X'$.

The resulting trend variables x(j) and y(j) can be used to plot a second ellipse according to the following equation:

$$\frac{[x(j) - \overline{X}]^2}{\sigma(x)^2} + \frac{[y(j) - \overline{Y}]^2}{\sigma(y)^2} = 1.$$

The ellipse for the jth test sequence is also shown in FIG. 11 offset from the baseline ellipse. This real time ellipse of two dimensional trend parameters provides a direct visual indication of the severity of the power imbalance condition.

Alternatively, the present inventive method contemplates finding the moving averages of the trend variables x(j), y(j) over all j test sequences in step 96. These moving averages $\overline{x}$ and $\overline{y}$ are used to define polar coordinates of the current real time trend variables. Thus, in step 98 the polar radius ρ(j) and polar angle θ(j) are obtained using the following relationships:

$$\rho(j) = \sqrt{\overline{x}^2 + \overline{y}^2}$$

$$\theta(j) = \arctan\left(\frac{\overline{y}}{\overline{x}}\right)$$

In the following step 100 of the inventive method, the ρ(j) and θ(j) values are evaluated to ascertain the cause of the engine deterioration and the rate of change. Specifically, in one feature of the present invention, the polar angle θ(j) can be evaluated to first determine whether the current engine power deterioration is attributable to a different cause. If the cause is the same as in prior test sequences, the polar angle θ(j) will remain constant or change only slightly. On the other hand, if a new cause for the deterioration arises, the angle θ(j) will change as well. Empirical analysis can be conducted to determine what polar angles can be assigned to a particular cylinder of the engine. Thus, when a specific polar angle θ(j) is obtained in step 98 the evaluation step 100 can pinpoint the affected cylinder. It is believed that this prognosis feature can be attributed to the singular value decomposition approach in which the two principal eigenvalues are used as the starting point of the engine deterioration analysis. The cylinder or root cause will have one of the two largest eigenvalues, leading ultimately to trend variables and polar coordinate values centered about that particular cylinder or root cause.

As with the one dimensional analysis, the two dimensional approach of FIG. 10 also contemplates evaluating the rate of deterioration of the cylinder power balance condition. In this instance, the rateD is a function of the change in the polar radius ρ(j). This rate of deterioration can be calculated as follows:

rateD=(1/M)*[ρ(j)−ρ(j−1)], where M represents the mileage differential between the current and prior test sequences.

This rateD value can be used in the same manner that the value is used in the one dimensional prognosis approach. Specifically, the rateD value can be evaluated for any significant increases and compared to a range of threshold values to determine a proper course of corrective action.

The present invention further contemplates using other engine operating parameters to determine the trend values in either of the approaches described above. In one alternative, the fuel trim to each cylinder can be evaluated rather than engine firing times. In a computer controlled engine, a fuel balance array is calculated and implemented as engine operating conditions warrant If the engine control computer detects a deterioration in cylinder performance, signals can be sent to the injector rack to provide more or less fuel flow to one cylinder. This offset in fuel flow to each cylinder can be defined as an array of fuel factors, which can then be passed through the methods of the present invention in the same manner that the array of firing times is used.

As a further alternative, the additional engine operating parameter, such as the fuel balance array, can be used as a secondary factor with the CPB values calculated from cylinder firing times. In this instance, a weighting constant can be applied to the secondary factor to normalize its effect to the CPB values. The trend parameters can then be based upon both the CPB and the secondary factor in the same manner described above.

While preferred embodiments of the invention have been illustrated and described in detail in the figures and accompanying specification, this description is not intended to be restrictive in character. Instead, it is understood that the present invention contemplates changes and modifications to the illustrated embodiments that may arise on consideration by a person of ordinary skill in the art to which this invention pertains.

What is claimed is:

1. A system for use with an internal combustion engine having a plurality of cylinders and an engine control computer for controlling the operation of each cylinder, the system operable for the diagnosis and prognosis of engine performance degradation and comprising:

means associated with the engine crankshaft for determining a cylinder firing time for each cylinder during a test sequence conducted at each of a plurality of engine operating hours/mileages;

a time processing unit associated with the engine control computer for calculating a differential firing time value as the difference in said firing time for each cylinder relative to the firing time for the immediately prior cylinder in the engine firing sequence;

a memory associated with the engine control computer for storing a plurality of said differential firing time values for each cylinder for all test sequences conducted at said plurality of engine operating hours/mileages; and means associated with the engine control computer for evaluating the trend of said plurality of differential firing time values for each cylinder over said plurality of engine operating hours/mileages, including:

means for calculating a trend parameter for each test sequence according to the equation;

$$y(j) = \sqrt{\sum_{i=1}^{6} Ci^{**}2},$$

where C is the differential firing time value, i=1–the number of cylinders, y(j) is the trend parameter for the current test sequence, and j is the number of the test sequence; and means for comparing said trend parameter to a boundary value and generating a signal indicative of a cylinder power imbalance condition if said trend parameter exceeds the boundary value.

2. The system according to claim 1, wherein said means for comparing includes means for calculating said trend boundary as a function of the mean and standard deviation of said trend parameters over a predetermined number of said test sequences.

3. The system according to claim 1, wherein said means for comparing includes means for calculating a rate of change of said trend parameter between said test sequences and evaluating said rate of change as an indication of a change in cause of the engine cylinder power imbalance.

4. The system according to claim 1, wherein said means for comparing includes means for calculating a magnitude of the change of said trend parameter between said test sequences and evaluating said magnitude to determine the severity of the engine cylinder power imbalance.

* * * * *

UNITED STATES PATENT AND TRADEMARK OFFICE
CERTIFICATE OF CORRECTION

PATENT NO.   : 6,230,095 B1                                     Page 1 of 1
DATED        : May 8, 2001
INVENTOR(S)  : Yue Yun Wang It is certified that error appears in the above-identified patent and that said Letters Patent is hereby corrected as shown below:

Column 5,
Line 43, please delete the word "tines" and insert -- times --.

Column 9,
Line 54, please delete the word "tie" and insert -- the --.

Signed and Sealed this

Eighth Day of January, 2002

Attest:

JAMES E. ROGAN
*Attesting Officer*     *Director of the United States Patent and Trademark Office*